UNITED STATES PATENT OFFICE

2,937,182
PREPARATION OF 2-ACYLAMINO-5-MERCAPTO-1,3,4-THIADIAZOLE

Richard Lawrence Shepard, Martinsville, N.J., assignor to American Cyanamid Company, New York, N.Y., a corporation of Maine No Drawing. Application January 28, 1959
Serial No. 789,516

10 Claims. (Cl. 260—306.8)

This invention relates to a process for the manufacture of 2-acylamino-5-mercapto-1,3,4-thiadiazole from N,N'-bis-(thiocarbamyl)-hydrazine and a lower alkanoic acid by reaction at elevated temperatures in an acidic aqueous environment; preferably in the presence of hypophosphorous acid. More particularly it relates to the preparation of 2-acetylamino-5-mercapto-1,3,4-thiadiazole in the presence of aqueous hydrochloric acid and hypophosphorous acid.

2-acetylamino-1,3,4-thiadiazole-5-sulfonamide and related compounds are described in a U.S. Patent 2,554,816 to Clapp and Roblin, "Heterocyclic Sulfonamides and Methods of Preparation Thereof," May 29, 1951.

2-acetylamino-1,3,4-thiadiazole-5-sulfonamide has been produced by the treatment of hydrazine with a thiocyanate to form N,N'-bis-(thiocarbamyl)-hydrazine; which has been cyclized to 2-amino-5-mercapto-1,3,4-thiadiazole; which has been acetylated to 2-acetylamino-5-mercapto-1,3,4-thiadiazole; which has been oxidized and chlorinated to 2-acetylamino-1,3,4-thiadiazole sulfonyl chloride which on treatment with ammonia gives 2-acetylamino-1,3,4-thiadiazole-5-sulfonamide.

In this comparatively long series of reactions, any increase in manufacturing efficiency is reflected in a reduction in price and availability. In the past it has been customary to cyclize N,N'-bis-(thiocarbamyl)-hydrazine to give 2-amino-5-mercapto-1,3,4-thiadiazole. United States Patent 2,759,947 to Song and Fitchett, "Preparation of Amino Mercapto 1,3,4-Thiadiazoles," August 21, 1956, describes and claims certain aspects of this reaction, particularly the reaction in the presence of hypophosphorous acid. This product has been acylated, as for example, described in U.S. Patent 2,823,208 to John Song, "Production of 2-Acylamino-5-Mercapto-Thiadiazole," February 11, 1958. This patent particularly claims the use of polyphosphoric acid as a reaction medium. Prior to the use of polyphosphoric acid, it had been customary to use acid anhydrides and acid chlorides for the acylation step.

It has now been found that the cyclization of N,N'-bis-(thiocarbamyl)-hydrazine and acylation to form 2-acylamino-5-mercapto-1,3,4-thiadiazole may be combined, and accordingly, the number of steps in the process is decreased, the operating cost is decreased, and an even higher yield is obtained than by conducting the two steps separately.

While the present invention is not to be considered as predicated upon any particular theory of reaction mechanisms, the results obtained are consistent with the theory that the cyclization of N,N'-bis-(thiocarbamyl)-hydrazine results from a thioketo-thiol shift of a hydrazine hydrogen to the adjacent thioketo sulfur on each end of the molecule to give a di-thiol from which ammonia can be eliminated to close the ring. It may also be noted that hydrogen sulfide can be eliminated to form the 2,5-diamino compound. 2-amino-5-mercapto-1,3,4-thiadiazole has a reactive amino group in the 2 position, which is subject to acylation. In the present invention, in which the acylating acid is present during the entire reaction, acylation can occur after the cyclization; or acylation of at least one of the thiocarbamyl groups may occur prior to ring closure. This would result in a modification of the reactivity of the terminal amine group which would tend to alter the equilibrium point and relative yields of the 2,5-diamino- and the 2-amino-5-mercapto-1,3,4-thiadiazole compounds. As mentioned above, the comparative rates of reaction and order of reaction are difficult to ascertain and such theoretical concepts are susceptable to divergent interpretations by different chemists. Whether this theoretical explanation is a full and complete one is open to discussion, but fortunately and fortuitously the present reaction conditions of combined reaction give a higher yield of the desired product than is obtained under operating conditions in which the two reaction steps are conducted separately.

Additionally time and operating steps are saved. In a laboratory where the reaction vessel is a flask, and simultaneously preparations are easily accomplished, such savings are not too critical. But in large scale industrial use, where an expensive reactor must be procured, and an additional operator employed, the saving of a step is a valuable contribution.

The present reaction is carried out in the presence of water and a hydrohalic acid, which is either hydrochloric or hydrobromic acid. For each 100 parts of N,N'-bis-(thiocarbamyl)-hydrazine from about 25 to 300 parts by weight of water is used as a reaction medium. More water may be added together with the appropriate quantities of acid but additional dilution increases the working volume without giving compensating advantages. The reaction is carried out in the presence of hydrochloric or hydrobromic acid using from 20 to 85 parts by weight calculated as real hydrogen chloride or real hydrogen bromide. The acylation is accomplished by from about 40 to 250 parts by weight of the alkanoic acid. When acetic acid is used from about 45 to 175 parts is effective with from 80 to 140 parts being preferred. The best results are obtained if from about 0.5 to 2.5 parts by weight of real hypophosphorous acid is present. Hypophosphorous acid is commercially conveniently obtainable as a 50% strength acid in water. This may be added to the reaction mixture as such or it may be diluted to about 5% with water in order that the volume to be added is more conveniently measurable.

Similarly, the alkanoic acid and the hydrohalic acid are usually added somewhat diluted with water. It is usually more convenient to use concentrated hydrochloric acid which contains about 35% real hydrogen chloride. Corrections in the amount of additional water are made to compensate for the amount which is introduced with the hypophosphorous acid or as hydrochloric acid or as moisture in the N,N'-bis-(thiocarbamyl)-hydrazine. Part of the water in the reaction medium may be dilute mother liquor from a preceding reaction. The use of such mother liquor permits the recycling of part of the hydrohalic and alkanoic acids, thus reducing the actual usage of these reagents. Where part of the mother liquor is recycled, modifications in the added quantities of the acid reagents may be made.

The order of addition, as well as the amount of water which is present with the various components as they are added, is immaterial to the final results. It is usually more convenient to add all of the liquid components together and then add the N,N'-bis-(thiocarbamyl)-hydrazine slowly, with stirring to prevent caking, to the combined liquids. If commercial availability dictates, at least some of the alkanoic acid or hypophosphorous acid may be added as a salt with a metal or a nitrogenous base which forms a soluble chloride, as such soluble chloride would not deleteriously affect the final reaction mixture. Under normal conditions of commercial availability, the acids themselves are preferred.

For the reaction to occur in an economically advantageous length of time, it is necessary that the reaction mixture be heated. The reaction may be conveniently carried out at atmospheric pressure at a temperature of above about 80° C. Temperature control and agitation are conveniently obtained by heating the reaction mixture to the reflux point and refluxing the mixture until the reaction is substantially complete. Depending upon the size of the reaction vessel and the rate of heating, reaction is substantially complete in from 2 to 6 hours. Lower temperatures for longer times or shorter times with higher rates of agitation and higher temperatures can give economically useful results. Usually, it is not economically advantageous to use pressure vessels to raise the reaction temperatures and an atmospheric pressure reflux is preferred. Specialized operating equipment which may be available under specific plant conditions may modify the normal economic picture and warrant such modifications of operating conditions.

The scope of the present invention is set forth in the appended claims but for purposes of clarity certain aspects of the invention are set forth in the following examples, in which parts are by weight unless otherwise specified.

Example 1

A mixture is prepared of 55 parts of water, 34 parts of real hydrogen chloride, 88 parts glacial acetic acid and 30 parts of 5% aqueous hypophosphorous acid. The mixture is heated to 85° C. and to the mixture, with stirring, is added 106 parts of N,N'-bis-(thiocarbamyl)-hydrazine. The mixture is heated with stirring to 100° C., held at this temperature for 15 minutes, and then heated to reflux, about 106° to 108° C., and held at reflux with stirring for 6 hours. The reaction mixture is cooled to 20° C. and the crystalline 2-acetylamino-5-mercapto-1,3,4-thiadiazole separated by filtration, washed with cold water and dried. 98.1 parts is obtained. This represents a yield of about 79.4%.

Example 2

To a mixture of 131 parts of water, 62.5 parts of real hydrogen chloride, 167 parts of glacial acetic acid and 28.4 parts of 5% hypophosphorous acid, heated to 85°, is added 100 parts of N,N'-bis-(thiocarbamyl)-hydrazine. The mixture is heated with stirring to 100° C. and held at 100° C. for about 15 minutes and then heated to reflux and held with stirring at reflux until the reaction is completed. The mixture is cooled at 20° C., and the crystalline 2-acetylamino-5-mercapto-1,3,4-thiadiazole separated by filtration. A yield of 96.5 parts is obtained representing approximately 82.8% of theoretical.

Example 3

310 parts of mother liquor from a prior reaction is mixed with 42 parts of real hydrogen chloride, 59 parts of glacial acetic acid and 2.8 parts of 50% hypophosphorous acid. The mixture is heated to 85° C. and with stirring is added 100 parts of N,N'-bis-(thiocarbamyl)-hydrazine. The mixture is slowly raised to reflux over a period of about 25 minutes, the mixture being constantly stirred; and held at reflux, a temperature of between 106° and 108° C., for a 7 hour work shift. The mixture is then cooled to 20° C. and the crystalline 2-acetylamino-5-mercapto-1,3,4-thiadiazole resulting is separated by filtration, washed with cold water and dried. 98.7 parts of product is obtained representing a yield of 84.6%.

Example 4

A mixture is prepared of 33 parts real hydrogen chloride, 52 parts of water, 102 parts of propionic acid and 28.3 parts of 5% hypophosphorous acid. The mixture is stirred and to the stirred mixture is added 100 parts of N,N'-bis-(thiocarbamyl)-hydrazine. The mixture is heated to reflux and held at reflux until the reaction is completed. The reaction mixture is cooled to about 20° C. and the crystalline 2-propionylamino-5-mercapto-1,3,4-thiadiazole obtained is separted and dried. The yield is about 75% of theoretical.

Example 5

A mixture of 139 grams of water, 33 grams of hydrogen chloride, real, and 88 grams of acetic acid is prepared, and to the mixture is added 92.5 grams of N,N'-bis-(thiocarbamyl)-hydrazine. The mixture is held at reflux for 6 hours, cooled and the crystalline 2-acetylamino-5-mercapto-1,3,4-thiadiazole separated by filtration. A yield of about 29% is obtained. In a comparable experiment in which hypophosphorous acid is added, higher yields of around 75% are obtained.

Example 6

A mixture of 55 parts of water, 81 parts of real hydrogen bromide, 88 parts glacial acetic acid and 30 parts of 5% hypophosphorous acid is mixed together and 100 parts of N,N'-bis-(thiocarbamyl)-hydrazine added thereto with stirring. The reaction mixture is heated to reflux and held at reflux for approximately 6 hours until the reaction is complete. The mixture is cooled to room temperature, filtered, and the resultant 2-acetylamino-5-mercapto-1,3,4-thiadiazole separated from the reaction mixture, washed with cold water and dried. About 90 parts of good quality 2-acetylamino-5-mercapto-1,3,4-thiadiazole is obtained.

In the following claims, parts are by weight.

I claim:

1. A process for preparing 2-acylamino-5-mercapto-1,3,4-thiadiazole, said acyl group being derived from an alkanoic acid, which comprises heating, and thereby reacting, N,N'-bis-(thiocarbamyl)-hydrazine with at least about a stoichiometric quantity of alkanoic acid in the presence of an aqueous hydrohalic acid selected from the group consisting of hydrochloric acid and hydrobromic acid.

2. The process of claim 1 in which the hydrohalic acid is hydrochloric acid.

3. The process of claim 1 in which the reaction is carried out in the presence of hypophosphorous acid.

4. The process of claim 1 in which the reaction is carried out in the presence of hypophosphorous acid.

5. A process for preparing 2-acetylamino-5-mercapto-1,3,4-thiadiazole which comprises heating and thereby reacting, N,N-bis-(thiocarbamyl)-hydrazine and at least about a stoichiometric quantity of acetic acid in the presence of an aqueous hydrohalic acid selected from the group consisting of hydrochloric acid and hydrobromic acid.

6. The process of claim 5 in which the hydrohalic acid is hydrochloric acid.

7. The process of claim 5 in which the reaction is conducted in the presence of hypophosphorous acid.

8. The process of claim 6 in which the reaction is conducted in the presence of hypophosphorous acid.

9. A process for preparing 2-acetylamino-5-mercapto-1,3,4-thiadiazole which comprises heating between 80° C. and reflux, and thereby reacting, 100 parts of N,N'-bis-(thiocarbamyl)-hydrazine, about 25 to 300 parts of water, about 20 to 84 parts hydrogen chloride, and about 45 to 175 parts glacial acetic acid.

10. The process of claim 9 in which the reaction is conducted in the presence of 0.5 to 2.5 parts of hypophosphorous acid.

No references cited.

UNITED STATES PATENT OFFICE

CERTIFICATE OF CORRECTION

Patent No. 2,937,182

May 17, 1960

Richard Lawrence Shepard

It is hereby certified that error appears in the printed specification of the above numbered patent requiring correction and that the said Letters Patent should read as corrected below.

Column 2, lines 17 and 18, for "simultaneously" read -- simultaneous --; line 67, for "alkanoice" read -- alkanoic --; column 3, line 12, for "recation" read -- reaction --; column 4, line 49, for the claim reference numeral "1" read -- 2 --; line 53, for "and at least" read -- with at least --.

Signed and sealed this 25th day of October 1960.

(SEAL)
Attest:
KARL H. AXLINE
Attesting Officer

ROBERT C. WATSON
Commissioner of Patents